March 7, 1967

A. R. VAN CORTLANDT WARRINGTON 3,308,345

ELECTRICAL-FAULT DETECTOR FOR DETECTING FAULT CURRENTS
HAVING AN APPRECIABLE HARMONIC CONTENT

Filed Sept. 2, 1964

A. R. VAN CORTLANDT WARRINGTON 3,308,345

ELECTRICAL-FAULT DETECTOR FOR DETECTING FAULT CURRENTS
HAVING AN APPRECIABLE HARMONIC CONTENT

Filed Sept. 2, 1964

United States Patent Office 3,308,345
Patented Mar. 7, 1967

3,308,345
ELECTRICAL-FAULT DETECTOR FOR DETECTING FAULT CURRENTS HAVING AN APPRECIABLE HARMONIC CONTENT
Albert Russell van Cortlandt Warrington, Stafford, England, assignor to The English Electric Company Limited, London, England, a British company
Filed Sept. 2, 1964, Ser. No. 393,839
Claims priority, application Great Britain, Sept. 12, 1963, 35,984/63
9 Claims. (Cl. 317—18)

This invention relates to an electrical-fault detector for detecting fault currents having an appreciable harmonic content. Such fault currents are manifested upon the occurrence of arc discharges or the passage of current through a non-linear resistance, which grossly distort the current waveform, and it has been found that such distortion is characteristic of many earth-leakage faults, e.g. a broken power supply conductor which is lying on the ground or incipient faults in wooden-pole mounted conductors or in "live" domestic appliances discharged through humans..

Accordingly, it is an object of this invention to detect faults of this nature and from one aspect, the invention consists in an electrical fault detector comprising a power supply line, sensing means coupled to said power supply line for developing a signal dependent on the line current, filter means for separating the fundamental and low harmonic frequency components from said signal, control means responsive to the remaining part of said signal and operable to derive a control signal therefrom, and detector means operable in response to said control signal upon the magnitude thereof exceeding a predetermined value whereby to detect only such faults as produce a distorted line current having an appreciable content of harmonics of higher order than said low frequency component.

Provision may be made to protect the detector means from damage in the event of the magnitude of the signal developed by the sensing means becoming excessive, and this may conveniently be effected by a saturable-core transformer disposed between the sensing means and the filter means. In addition, a time-delay circuit may be incorporated in order to delay the operation of the detector means until the control signal has exceeded the predetermined value for a specific period.

Several embodiments of the invention will now be described by way of example and with reference to the accompanying drawings, in which.

Similar items are similarly referenced in all the figures.

Figure 1:
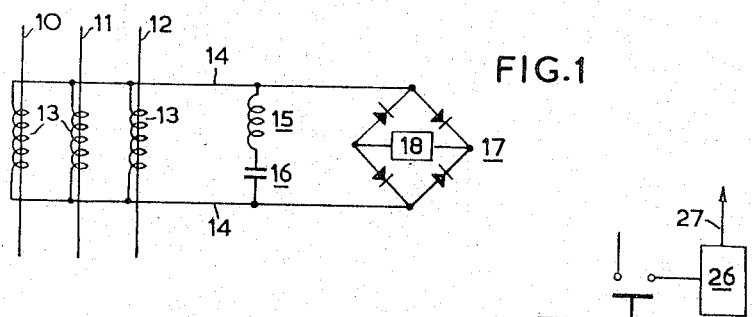
FIG. 1 is a circuit diagram of one electrical fault detection arrangement embodying the invention.

In FIG. 1, the lines 10, 11 and 12 represent the three conductors of a three-phase alternating current power supply system which is to be protected against the condition which occurs when a conductor falls to the ground, or when a high resistance leakage path develops in an underground cable, and in which the current flow to earth is not sufficient to operate the normal short-circuit trip relays. Such a condition, by virtue of the potential gradient developed in the ground near the fallen conductor or near the leakage path, presents a dangerous hazard to life.

The currents in the lines 10, 11 and 12 are monitored by current transformers 13 whose primary windings respectively comprise the lines themselves. An alternating electrical signal dependent on the resultant of the three line currents is produced in a circuit 14. A by-pass filter circuit comprising an inductor 15 and a capacitor 16 is connected across the circuit 14 to provide a low impedance path for the fundamental component and second and third harmonic frequency components of the electrical signal so as to modify the signal by substantially removing these components. The filter circuit is tuned to a frequency of twice the nominal system frequency and has a flat characteristic. A bridge-type rectifier network 17 is connected in parallel with the filter circuit and its D.C. output terminals are connected to supply a polarised relay 18. The relay thus responds to the high harmonic frequency components of the alternating electrical signal produced in the circuit 14 but is less affected by the fundamental or second and third harmonic frequency components thereof which are largely shunted by the filter circuit.

It has been found that, when a small current flows to earth through a leak such as has been described, the current flow is in the form of intermittent arcing or sparking between the conductor and earth, and because of this and the non-linear resistance of the earth, mostly consists of the high harmonic frequency components, that is, the components not normally ocurring, or only ocurring with insubstantial magnitudes, in healthy power systems. Thus, in operation, should such a fault occur, the signal produced in the circuit 14 will contain these high harmonic frequency components and the relay 18 will be operated giving a warning indication. It should be noted, however, that the relay may also be operated by other faults or unbalance conditions which increase the fundamental or low harmonic frequency components of the fault signal if the increase is substantial.

If the transformers 13 are air-cored instead of iron-cored, they will be more sensitive to the high harmonic frequencies, and will thus increase the sensitivity of the arrangement.

Figure 2:
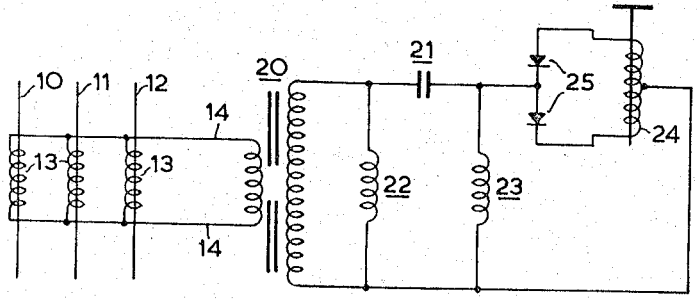
FIG. 2 is a circuit diagram of a second electrical fault detection arrangement embodying the invention.

In FIG. 2, the current transformer 13 feeds a transactor 20 which produces an alternating voltage signal proportional to the current supplied to it. This signal is fed across a by-pass filter circuit comprising a capacitor 21 and two inductors 22 and 23. The filter circuit provides shunt paths for by-passing the fundamental frequency and second and third harmonic frequency components of the voltage signal. The voltage signal is then connected across the coil of a polarised relay 24 through rectifiers 25 arranged to give full wave rectification. The contacts of the relay 24 operate to connect a power supply (not shown) in series with a time delay circuit 26 which provides an output signal on the line 27 when it has received an input signal from the relay contacts for a predetermined length of time.

When the high harmonic frequency content of the voltage signal exceeds a certain magnitude, the relay 24 will be operated and will initiate operation of the time delay circuit 26. After the predetermined length of time, the latter circuit will produce an output signal on the line 27 indicating the presence of a fault of the type described. The transactor 20 operates to render the circuit more sensitive since it accentuates the high harmonic frequency components of the current supplied to it at the expense of the fundamental and low harmonic frequency components.

Figure 3:
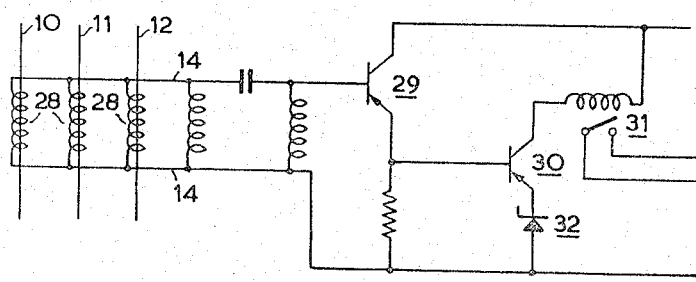
FIG. 3 is a circuit diagram of a third electrical fault detection arrangement embodying the invention.

In FIG. 3, the current transformers 13 and the transactor 20 of FIG. 2 have been replaced by current transformers 28 having air-cores. The electrical signal from the transformers is passed through a filter circuit similar to that shown in FIG. 2 and applied to the base of a pnp transistor 29. The amplified signal from transistor 29 is fed to a second pnp transistor 30 where it is further amplified. The further amplified signal is fed through the coil of a reed relay 31. A zener diode 32 provides a stable emitter biasing voltage for the transistor 30. When the high harmonic frequency content of the electrical signal in the circuit 14 exceeds a certain value, the relay 31 will operate to produce a warning indication as before.

Figure 4:
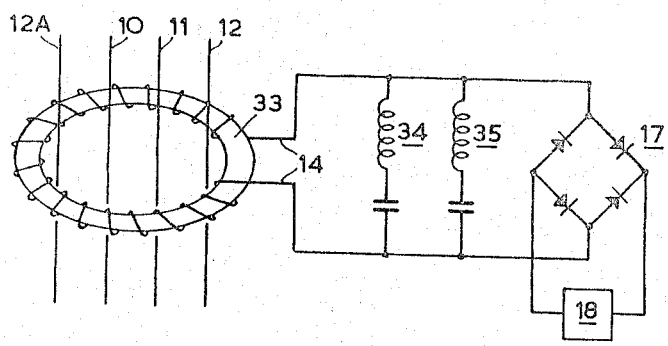
FIG. 4 is a circuit diagram of a modification to the arrangement of FIG. 1.

FIG. 4 shows an arrangement including a core-balance type current transformer 33 instead of separate current transformer windings. This arrangement is advantageous where the power supply system has four lines 10, 11, 12 and 12A, the latter being the neutral connection, since it eliminates errors due to load unbalance: it also overcomes the errors which will arise if separate current transformer windings with slightly different characteristics are used. The circuit has two by-pass filter circuits 34 and 35 each comprising an inductance and a capacitance. One filter circuit is tuned to the fundamental frequency and the other to the third harmonic frequency. The arrangement operates in a manner similar to the arrangement of FIG. 1.

Figure 5:
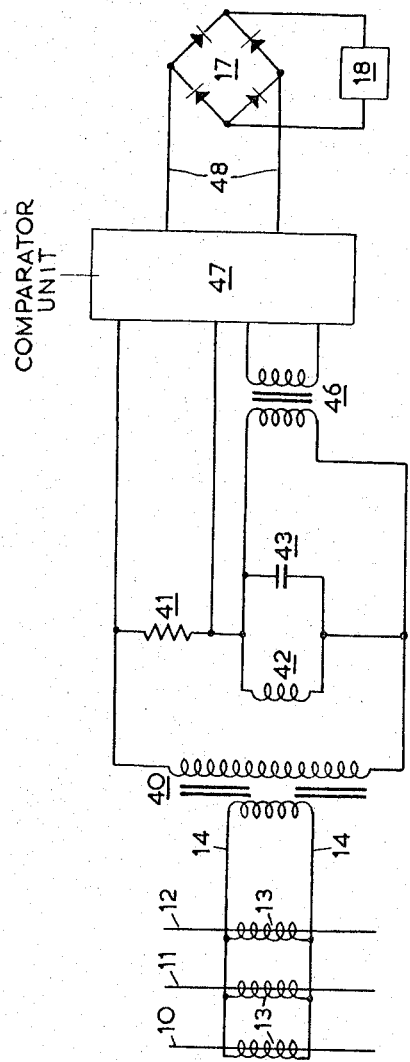
FIG. 5 is a circuit diagram of a fourth electrical fault detection arrangement embodying the invention.

In FIG. 5, the three current transformer windings 13 again produce a current in the circuit 14 proportional to the resultant of the current in the three lines 10, 11 and 12 of the power supply system. This signal is applied across the primary winding of a transactor 40 whose secondary winding is connected across a resistor 41 connected in series with a filter circuit comprising an inductor and capacitor 42 and 43. The primary winding of a transformer 46 is connected across the filter circuit. A comparator unit 47 receives two inputs: one input is received from the secondary winding of the transformer 46 and the other is connected across the resistor 41. An output circuit 48 from the comparator unit 47 is connected across a bridge rectifier 17 feeding a relay 18.

In operation, the transactor 40 produces an alternating voltage signal which is applied across the resistor 41 and the filter circuit. As in the case of the transactor 20 in FIG. 2, the transactor 40 accentuates the magnitudes of the high harmonic frequency components of the current supplied to it at the expense of the magnitude of the fundamental and low-harmonic frequency components.

The voltage developed across the resistor 41, which is fed into the comparator unit 47, is proportional to the total alternating voltage signal from the transactor 40. The filter circuit is tuned to present a high impedance to the fundamental frequency component of the alternating voltage signal so that this component is applied across the primary winding of the transformer 46: the filter circuit has a low impedance to the high harmonic frequency components which, because of this, do not appear across the primary winding of the transformer 46. The secondary winding of the transformer 46 therefore produces an output, fed into the comparator unit 47, which is proportional to the proportion of the fundamental frequency component in the alternating voltage signal.

The comparator unit 47 compares the two inputs received and produces an output dependent on the amount by which the fundamental frequency component is less than the total alternating voltage signal. The output from the comparator unit is rectified by the bridge rectifier 17 and operates the relay 18 when its magnitude exceeds a predetermined value. The circuit of FIG. 5 therefore operates similarly to the others in that it detects when a fault condition, such as has been described, causes the current in the power supply lines to contain a larger-than-normal proportion of high harmonic frequency components. By accentuating the high harmonic frequency components, the transactor 40 renders the circuit more sensitive.

What I claim as my invention and desire to secure by Letters Patent is:

1. An electrical-fault detector comprising
a power supply line,
sensing means coupled to said power supply line for developing a signal dependent on the line current, said sensing means comprising
   a transactor having a non-linear frequency response whereby to accentuate the magnitude of the high frequency components relative to the low frequency components of said signal,
filter means for separating the fundamental and low harmonic frequency components from said signal,
control means responsive to the remaining part of said signal and operable to derive a control signal therefrom, and
detector means operable in response to said control signal upon the magnitude thereof exceeding a predetermined value whereby to detect only such faults as produce a distorted line current having an appreciable content of harmonics of higher order than said low frequency component.

2. A fault detector according to claim 1, wherein said low harmonic frequency components are the second and third harmonics of the fundamental.

3. A fault detector according to claim 2, wherein the filter means comprises
a high-pass filter for passing to the control means, without substantial attenuation, only those components of said signal having a frequency higher than the said third harmonic.

4. A fault detector according to claim 2, wherein the filter means comprises
a tuned circuit tuned to present a low impedance to only the fundamental and the second and third harmonics of said signal, and including
means connecting said tuned circuit in shunt relationship with said control means.

5. An electrical fault detector for detecting high resistance line faults which involve the passage of current through a non-linear resistance such as to produce a distorted waveform comprising
a power supply line,
sensing means coupled to said power supply line for developing a signal dependent on line current,
filter means connected to said sensing means for separating the fundamental and low harmonic frequency components from said signal,
a comparator connected to said filter means and having a first input for receiving said signal from the sensing means, a second input for receiving said fundamental and low harmonic frequency components separated by the filter means, means for developing an output signal dependent on the difference between the signals applied to the first and second inputs, and
detector means operable in response to said output signal in dependence on the magnitude thereof whereby to detect only such faults as produce a distorted line current having an appreciable proportion of harmonics of higher order than said low frequency components.

6. A fault detector according to claim 5, wherein the filter means comprises
a tuned circuit tuned to present a low impedance to only those components having a frequency higher than said third harmonic, and including
means connecting said tuned circuit in shunt relationship with said second input of said comparator.

7. An electrical-fault detector comprising
a power supply line,
an air-cored current transformer coupled to said power supply line for developing a signal dependent on the line current,
filter means having an input connected to receive the signal from said current transformer, and an output, and
relay means connected to said output for performing a protective or alarm function, the filter means being operable to remove from said signal those components having a frequency equal to and lower than the third harmonic of the fundamental so that said relay means receives only those components of said signal having higher harmonic orders, and said relay being operable to perform said function only upon the resultant magnitude of those components exceeding a predetermined value, whereby said function is performed only upon such faults being manifested as produce an appreciable content of harmonics of higher order than the third.

8. A fault detector according to claim 7, wherein the secondary winding of a said current transformer is separately coupled to each phase conductor in a multi-phase supply line, and including means for connecting together the secondary windings of all the transformers whereby said signal comprises the resultant of the currents in the conductors.

9. A fault detector according to claim 7, wherein said power supply line is multi-phase, and the current transformer comprises a core embracing all the phase conductors and on which a common secondary winding is wound.

References Cited by the Examiner

UNITED STATES PATENTS

| | | | |
|---|---|---|---|
| 1,539,834 | 6/1925 | Gaarz | 317—18 |
| 1,759,952 | 5/1930 | McCurdy | 317—27 |
| 2,474,290 | 6/1949 | Terry et al. | |
| 2,863,100 | 12/1958 | Rice | 317—27 |
| 3,015,774 | 1/1962 | Eigen | 324—54 |
| 3,165,671 | 1/1965 | Mintz | 317—27 |
| 3,223,889 | 12/1965 | Schweitzer | 317—53 X |

FOREIGN PATENTS

| | | |
|---|---|---|
| 139,304 | 6/1930 | Switzerland. |
| 145,544 | 6/1931 | Switzerland. |

MILTON O. HIRSHFIELD, *Primary Examiner.*

SAMUEL BERSTEIN, *Examiner.*

R. V. LUPO, *Assistant Examiner.*